(12) United States Patent
Marshall et al.

(10) Patent No.: US 11,163,288 B2
(45) Date of Patent: Nov. 2, 2021

(54) MEASUREMENT METHOD AND APPARATUS

(71) Applicant: RENISHAW PLC, Wotton-under-Edge (GB)

(72) Inventors: Derek Marshall, Hawkesbury Upton (GB); John Charles Ould, Backwell (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

(21) Appl. No.: 15/562,833

(22) PCT Filed: Mar. 30, 2016

(86) PCT No.: PCT/GB2016/050880
§ 371 (c)(1),
(2) Date: Sep. 28, 2017

(87) PCT Pub. No.: WO2016/162665
PCT Pub. Date: Oct. 13, 2016

(65) Prior Publication Data
US 2018/0107190 A1    Apr. 19, 2018

(30) Foreign Application Priority Data

Apr. 9, 2015 (GB) .................................... 1505999

(51) Int. Cl.
*G05B 19/401* (2006.01)
*G01B 21/04* (2006.01)
*G05B 19/408* (2006.01)

(52) U.S. Cl.
CPC ......... *G05B 19/401* (2013.01); *G01B 21/042* (2013.01); *G01B 21/047* (2013.01); *G05B 19/4083* (2013.01)

(58) Field of Classification Search
USPC .................................................. 700/195, 57
See application file for complete search history.

(56) References Cited

U.S. PATENT DOCUMENTS

| 3,633,011 A | 1/1972 | Bederman et al. |
| 4,901,256 A * | 2/1990 | McMurtry ............ G01B 7/008 33/503 |

(Continued)

FOREIGN PATENT DOCUMENTS

| CN | 1851400 A | 10/2006 |
| CN | 102803893 A | 11/2012 |

(Continued)

OTHER PUBLICATIONS

Nov. 14, 2018 Office Action issued in Chinese Patent Application No. 201680033906.0.

(Continued)

*Primary Examiner* — Emilio J Saavedra
(74) *Attorney, Agent, or Firm* — Oliff PLC

(57) ABSTRACT

A method is described for analysing probe data collected by a scanning probe carried by a machine tool. The probe data is collected as the machine tool moves or scans the scanning probe along a scan path relative to a workpiece. The method includes a step of identifying a property of the scan path used by the machine tool from a characteristic of the collected probe data. In this manner, the scan path can be identified from the probe data alone without having to receive any position data from the machine tool.

18 Claims, 5 Drawing Sheets

(56) References Cited

U.S. PATENT DOCUMENTS

| | | |
|---|---|---|
| 6,400,998 B1 | 6/2002 | Yamazaki et al. |
| 7,765,708 B2 | 8/2010 | Hellier |
| 7,779,553 B2 | 8/2010 | Jordil et al. |
| 7,970,488 B2 | 6/2011 | Prestidge et al. |
| 2006/0249675 A1 | 11/2006 | Taniuchi et al. |
| 2008/0051927 A1* | 2/2008 | Prestidge ............. G05B 19/401 700/195 |
| 2008/0161961 A1 | 7/2008 | Piggott et al. |
| 2008/0189969 A1 | 8/2008 | Fuchs et al. |
| 2008/0249737 A1* | 10/2008 | Jordil ................... G01B 21/04 702/152 |
| 2009/0235547 A1* | 9/2009 | Hellier .................. G01B 21/04 33/503 |
| 2010/0018069 A1 | 1/2010 | Ould et al. |
| 2010/0050837 A1* | 3/2010 | Ould .................... G01B 21/042 83/14 |
| 2012/0072170 A1 | 3/2012 | McKendrick et al. |
| 2014/0222189 A1 | 8/2014 | Chang et al. |

FOREIGN PATENT DOCUMENTS

| | | | |
|---|---|---|---|
| CN | 103962889 A | | 8/2014 |
| DE | 4212455 A1 | | 10/1993 |
| JP | S63-106514 A | | 5/1988 |
| JP | 2007-518579 A | | 7/2007 |
| JP | 2008/256696 A | | 10/2008 |
| JP | 2010-513042 A | | 4/2010 |
| JP | 2014/126381 A | | 7/2014 |
| WO | 1998/19821 A1 | | 5/1998 |
| WO | 2008/074989 A1 | | 6/2008 |
| WO | 2013/156765 A1 | | 10/2013 |
| WO | 2013/156767 A1 | | 10/2013 |
| WO | 2013/156769 A1 | | 10/2013 |

OTHER PUBLICATIONS

Jul. 6, 2016 International Search Report issued in International Patent Application No. PCT/GB2016/050880.

Jul. 6, 2016 Written Opinion issued in International Patent Application No. PCT/GB2016/050880.

May 6, 2015 Search Report issued in British Patent Application No. GB1505999.1.

* cited by examiner

MEASUREMENT METHOD AND APPARATUS

BACKGROUND

1. Technical Field

The present invention relates to measuring objects using a scanning probe carried by a machine tool. In particular, the invention relates to a method for identifying the type of scan path used by the machine tool from probe data collected by the scanning probe.

2. Related Art and Problem(s) to be Solved

A wide variety of machine tools are used for manufacturing workpieces. It is also common for workpieces to be manufactured using multi-process machining in which a workpiece is loaded into a series of different machine tools to cut the various features of the workpiece that are required. It is also known to mount a measurement probe in the spindle of a machine tool to allow certain features of a workpiece to be measured using the machine tool. Such measurements may be used to establish the location of the workpiece and/or dimensions of the cutting tools prior to machining to ensure the machining operation is performed with the cutting tool in the correct location relative to the workpiece. Measurements may also be performed to inspect a machined workpiece prior to its removal from the machine tool. Such workpiece inspection can be used to verify a cutting operation has been performed correctly.

It is known to measure points on the surface of a workpiece using a spindle mounted scanning probe comprising a deflectable stylus and having one or more transducers for measuring stylus deflection in a local (probe) coordinate system. The stylus deflection measurements acquired by the scanning probe are typically termed probe data and the measured position of the scanning probe within the coordinate system of the machine tool is typically termed machine data. The machine data and probe data can then be combined, after suitable calibration factors are applied, to establish the position of points on the surface of the object. The volume of data generated during such a measurement process is often too great to be handled by the machine tool processor itself and data analysis is thus typically performed using an external processing system (e.g. a standalone personal computer) that is separate to the machine tool. As described in U.S. Pat. No. 7,970,488, a timing synchronisation signal received by both the machine tool and scanning probe system can ensure the probe data and machine data are temporally aligned before being combined.

The process of combining machine data with probe data mentioned above typically requires both the machine data and the probe data to be transferred to an external processing system. Once received, the probe data and machine data are processed to calculate the position of points on the surface of the workpiece. These surface position measurements may then be further analysed, for example by comparison to nominal values. It has been found that the time required to transfer machine data to the external processing system can vary greatly for different types of machine tools, especially when large amounts of data have been collected. Even after receipt of the probe and machine data, there are typically further delays whilst the necessary analysis is performed. These delays reduce the amount of time that the machine tool is usable for cutting operations; i.e. the cycle time is increased. Even relatively short increases in cycle time can reduce the throughput of a machine tool based process.

Attempts have been made previously to avoid the need to combine probe data with machine data. For example, U.S. Pat. No. 7,765,708 describes a tolerance checking procedure in which a measurement probe (e.g. a scanning probe) can be driven along a path relative to an object that is based on a tolerance of the object. The probe data generated whilst the path is being traversed may then be compared to a suitable threshold and an "out of tolerance" warning issued if the threshold is breached. It has also been described in U.S. Pat. No. 7,970,488 how probe data can be combined with assumed machine data instead of using the machine data collected by the machine tool. These techniques, however, still require the external processing system to have information on the path along which the probe is being driven. If available at all, the data links (e.g. RS-232, file polling or software connections) that are provided on typical machine tools for transferring the necessary information to an external processing system can be difficult to configure. Such data links may also be relatively slow, thereby negatively impacting cycle times.

SUMMARY

According to a first aspect of the present invention, there is provided a method for analysing probe data collected by a scanning probe carried by a machine tool, the probe data being collected as the machine tool moves the scanning probe along a scan path relative to a workpiece, characterised in that the method comprises the step of identifying a property of the scan path used by the machine tool from a characteristic of the collected probe data.

The method of the present invention thus comprises analysing probe data collected from a scanning probe that is carried by a machine tool (e.g. carried in the machine tool spindle). The scanning probe is configured to measure a series of points on the surface of the workpiece as the machine tool moves it along a scan path relative to the workpiece. As explained in more detail below, the scanning probe may be a non-contact (e.g. optical, inductive, capacitive) scanning probe or a contact scanning probe having a workpiece contacting stylus. In the case of a contact scanning probe, a deflectable stylus and one or more deflection sensors for measuring deflection of the stylus may be provided. To collect probe data, the machine tool brings the stylus of the contact scanning probe into contact with the workpiece and moves it along a path on the surface of the workpiece. The deflection sensors then allow the position of the stylus tip to be measured relative to the probe housing whilst the path along the surface of the workpiece is traversed. In a preferred embodiment, the scanning probe includes deflection sensors that can measure both the magnitude and direction of any stylus deflection such that the collected probe data analysed using the method of the present invention describes stylus tip deflection in a probe (a, b, c) coordinate system.

The probe data may have been collected using a machine tool that is programmed to drive the scanning probe along a plurality of different scan paths relative to the workpiece. For example, the machine tool may be pre-programmed with a known set of such scan paths or it may be programmable with any desired scan path. The present invention allows a property of the scan path to be identified from the collected probe data without having to receive any data from the machine tool. In particular, the method of the present invention comprises recognising a characteristic of the collected probe data to allow a property of the scan path to be identified.

Any suitable property of the scan path may be identified using the method of the present invention. The property of the scan path that is identified may be a general category of scan path; e.g. it may be ascertained whether the scanning probe was driven along a circular scan path, a linear scan path etc. Alternatively, a more specific property of the scan path may be identified. For example, the type of circular path (such as a circular scan of a bore or a boss) or the length of a linear path may be identified. Furthermore, the identified property may be the precise scan path program that was used by the machine tool when collecting the probe data. The method may also comprise identifying a property of the measurement probe (e.g. a length of the stylus of a contact measurement probe) that is used by the machine tool to collect the probe data.

Furthermore, the method may comprise using any suitable characteristic of the probe data to identify the property of the scan path. The characteristic may, for example, be a variation in the direction of stylus deflection of a contact scanning probe as it traverses a scan path. The characteristic may also or alternatively be a variation in the magnitude of stylus deflection of a contact scanning probe as it traverses a scan path. The amount of stylus deflection in a certain direction may also be a suitable characteristic. If the probe data is provided as a discrete data set, then the number of data points contained within the data set may also be a suitable characteristic. As explained below, the machine tool may even be programmed to drive the scanning probe along scan paths that include variations or deviations in scanning probe motion that introduce a recognisable characteristic into the probe data. For example, the scanning probe may be driven along a scan path that includes a signalling segment comprising a characteristic move (e.g. a wiggle, step, dwell etc.) that provides a characteristic in the probe data that can be identified. In a further example, the scan path along which the measurement probe is moved may also comprise one or more "dwell" periods in which relative motion is temporarily stopped (i.e. so the measurement probe temporarily dwells in a particular location relative to the workpiece).

The method of the present invention thus allows a property of the scan path to be identified without needing any information from the machine tool. The method may thus be performed on a processor (e.g. computer) that is separate from the machine tool and receives only probe data from the scanning probe. The ability to identify a scan path from probe data alone means that such probe data can start to be analysed without having to wait for information from the machine tool and without having to assume probe data from a certain scan path has been received. This process can reduce the cycle time associated with a workpiece inspection or workpiece location measurement thereby increasing the throughput of a machine tool. This is especially advantageous in high throughput, serial machining, applications and the like where even small reductions in cycle times can provide significant cost savings.

The step of identifying a property of the scan path may involve identifying a type of scan path along which the scanning probe was moved to generate the probe data. Advantageously, the step of identifying a property of the scan path comprises identifying a type of scan path from a plurality of different types of scan path. In other words, the machine tool may be programmed to move the scanning probe along any one of a plurality of known types of scan path (e.g. circular paths, line paths etc.). The method may then involve analysing the probe data for characteristics that allow the type of scanning path to be recognised from the plurality of potential types of scan paths that may be used by the machine tool. Each type of scan path that can be used by the machine tool is thus preferably arranged to generate probe data having a characteristic that can be distinguished from the other scan path types.

A general class or type of scan path (rather than the precise scan path used) may be thus identified from a characteristic of the collected probe data. It should be noted that each type of scan path may comprise a plurality of different scan paths. For example, the machine tool may be programmed to drive the scanning probe around multiple different circular scan paths (e.g. of different radii, centre, etc.) that fall within the category of a circular scan path type. In such an example, the probe data may be analysed to identify if any such circular scan path has been used to generate the probe data. If such a circular scan path has been used, then further analysis of the probe data using techniques suitable for analysis of probe data acquired from a circular path may be implemented.

Advantageously, the step of identifying a property of the scan path comprises identifying a scan path from a plurality of different scan paths. The machine tool may thus be programmed to drive the scanning probe along a plurality of different scan paths. Each of the different scan paths may generate probe data having characteristics that can be distinguished from each other. In other words, each scan path that may be used by the machine tool may generate probe data that is distinguishable from all other scan paths used by that machine tool. In this manner, the exact scan path being used by the machine tool is the property of the scan path that is identified from the characteristic of the collected probe data. This allows data analysis tailored to the specific scan path to be performed.

The characteristic of the collected probe data conveniently comprises an inherent characteristic of the probe data. This inherent characteristic may be associated with the measurement of a feature or features of the workpiece. The different scan paths used by the machine tool to measure different features may thus inherently produce probe data having characteristics that can be distinguished from each other. As outlined in more detail above, the scanning probe may comprise a contact scanning probe having a deflectable stylus. The inherent characteristic may then comprise a variation in the direction of stylus deflection and/or the magnitude of stylus deflection in a certain direction, as described below.

A circular, or substantially circular, scan path (e.g. to measure a bore or a boss) typically produces rotation of stylus deflection direction as the scan path is traversed. In one embodiment, the machine tool may be configured to scan bores and bosses in opposite directions. For example, bores may be scanned in a clockwise direction and bosses in an anti-clockwise direction (or vice versa). The difference in stylus deflection variation that results from clockwise or anticlockwise scan path can then be identified, which in turn allows it to be established whether a bore or boss is being scanned.

In another embodiment, probe data from differently orientated surfaces of an object can be identified from the direction of stylus deflection. For example, a linear scan along a substantially flat surface of an object will result in stylus deflection in a certain direction that depends on the orientation of that surface and the friction or drag between the stylus tip and the object. The stylus deflection direction associated with such a linear scan can thus enable an approximate surface orientation to be established. For example, the orientation of the surface being scanned may be established from the probe data to within approximately 20°. This allows probe data collected when scanning different surfaces of an object (e.g. probe data collected from line scans along four different sides of a rectangle) to be distinguished. Similarly, a scan along the top surface of an object may produce stylus deflection in a direction different to a line scan along a side surface of an object. These inherent characteristics of the collected probe data may thus be used to identify a property of the scan path used by the machine tool.

It may not always be possible to distinguish probe data that is collected from similar scan paths. For example, it would typically not be possible to distinguish between sets of probe data collected from scans along two parallel lines on the same surface of an object. The characteristic of the collected probe data may thus comprise a variation in probe data that is provided by introducing one or more variations into the scan path to allow the scan path to be identified. In other words, a scan path of the machine tool may be adapted to introduce a characteristic into the resulting probe data that can be recognised and thereby allow a property of the scan path to be identified. The characteristic may thus be artificially introduced rather than being an inherent feature of probe data collected for a certain type of measurement. It would, of course, also be recognised that artificially introduced and inherent features of the probe data may be used together to allow a property of the scan path to be identified.

Advantageously, the scan path used by the machine tool comprises at least one signalling segment that produces probe data having an identifiable characteristic. For example, the scan path may include an initial signalling segment in which the probe is driven along a path that causes a characteristic feature to be introduced into the collected probe data. The signalling segment may conveniently introduce steps in measured stylus deflection that encode information on the scan path. For example, a binary codeword may be encoded by the signalling segment. If the machine tool was programmed with a plurality of different potential scan paths, each scan path could include a different signalling segment (e.g. a different binary codeword) that allows the scan path to be identified by the present method. The processor performing the probe data analysis method may also store information on the signalling segments that might occur; e.g. it could store information on the codeword associated with different scan paths.

The scanning probe may be arranged to output a continual stream of probe data. This stream of probe data may be passed from the scanning probe to an external processor (e.g. computer) via a probe interface. Analysis of the probe data from a scan path may thus be started whilst probe data is still being collected. The collected probe data may comprise a discrete set of data points collected between the machine tool issuing instructions to the scanning probe to start collecting probe data and to stop collecting probe data. In other words, the probe data may comprise a discrete set of data points collected between probe enable-on and probe enable-off instructions that are issued by the machine tool to the scanning probe. These enable-on and enable-off instructions may be issued to the scanning probe by the machine tool at the start and end of each scan path. In this manner, a probe data set may be passed to an external processor after it has been collected for each scan path. Analysis of the probe data from a scan path may thus be started after all the probe data for that scan path has been collected. Conveniently, the characteristic of the collected probe data may comprise the number of data points within the set of data points. A property of the scan path may thus be identified by the amount of probe data collected. This may, for example, allow longer calibration scan paths to be distinguished from simple workpiece location or inspection scan paths.

A characteristic of the collected probe data may also comprise the number of data points within the set of data points that are collected during a "dwell" period of the scan path; i.e. a part of the scan path during which probe data is collected by the measurement probe but motion of the measurement probe relative to the object is temporarily halted (i.e. so the nominal probe deflection does not vary). The dwell period of the scan path may occur before the probe is then driven along the object's surface. In one embodiment, the machine tool may be programmed to dwell for a period of time before, during and/or after the collection of measurement data. The dwell can thus be seen to introduce an identifiable characteristic into the collected probe data. In one example, the machine tool may be programmed so that different scan paths include dwells of different duration (e.g. dwells of 1 second, 1.5 seconds, 2 seconds etc). The duration of the dwell period may then be used as the characteristic of the collected probe data that identifies a property of the scan path used by the machine tool. In one embodiment, the duration of the dwell period may be used to identify the length of the stylus of the measurement probe used to collect the probe data.

As explained above, the duration of a dwell period may be identified from the number of data points that are collected whilst the measurement probe is stationary. If the duration of a dwell is to be used in this manner, an initial configuration process may also be performed during which probe data is collected whilst the machine tool is commanded to execute a certain duration dwell (e.g. an extended dwell period). The number of data points collected during this known duration dwell period allows the calculation of the number of data points that should be expected when the machine tool is instructed to dwell for a certain period of time.

The method may comprise identifying one property of a scan path. For example, the method may comprise using a characteristic of collected probe data to ascertain if a circular scan path had been used. The property of the scan path is then simply defined as being circular or non-circular. Alternatively, the method may comprise identifying the properties of a plurality of different scan paths from different characteristics of collected probe data. In other words, a plurality of different properties (e.g. at least three different properties, at least five different properties etc) may be identified from the collected probe data. The method may thus be used to identify a property of each of a plurality of scan paths that are used in series to measure different features of a part. Advantageously, probe data is thus collected as the machine tool moves the scanning probe along a plurality of scan paths relative to the workpiece. A property of each of the plurality of scan paths may then be identified from a characteristic of the probe data collected from each scan path. This allows the order in which features of a workpiece are inspected to be altered (e.g. by reprogramming the machine tool) without having to also reprogram the processor used to analyse the collected probe data.

After a property of the scan path has been identified, the subsequent analysis of the probe data can be tailored accordingly. A further step may thus be performed of analysing the probe data to extract measurement information, wherein the type of analysis performed on the probe data is determined from the identified property of the scan path. For example, if the probe data is identified as being generated from a circular scan path then the probe data could subsequently be analysed using a process suitable for circular scan paths (e.g. to confirm the circular feature has a circularity within a certain tolerance band).

The measurement information found by appropriately analysing the probe data may comprise workpiece location or workpiece inspection information. For example, a workpiece location procedure may be performed that comprises comparing the acquired probe data to the probe data that would be expected if the object was placed (e.g. fixtured) in a nominal location and orientation within the machine tool. Any differences between the collected probe data and the nominal (expected) probe data may then be used to generate one or more work offset corrections. These work offset corrections may be fed to the machine tool. The work offset corrections may allow any deviation of the workpiece from its nominal position and orientation to be taken into account (i.e. corrected) during subsequent machining operations. In other words, the NC of the machine tool may use the work offset corrections to update the work offsets used in the machining process.

The method of the present invention may be performed by any suitable processor. The processor may be provided within the scanning probe, within an interface that is associated with the scanning probe or within the machine tool. Advantageously, the step of identifying a property of the scan path used by the machine tool from a characteristic of the collected probe data is performed on a processor that is external to the machine tool. The processor may comprise a personal computer or the like. The external processor may be linked to a probe interface. A wireless link (e.g. optical or radio) may be provided between the scanning probe and the probe interface. There may be no data linked provided between the processor and the machine tool. Alternatively, a low-speed data link may be provided between the processor and the machine tool. The processor may feed information to the machine tool to update cutting instructions etc.

Any scanning probe may be used in the method. The scanning probe may be a non-contact (e.g. optical, capacitive, inductive) scanning probe. The scanning probe may be a contact scanning probe. A contact scanning probe may be provided that has a deflectable stylus. The stylus may be deflectable relative to the housing of the scanning probe in any one of two mutually perpendicular directions or in any of three mutually perpendicular directions. At least one transducer may then be provided within the scanning probe for measuring the amount of deflection of the stylus. The scanning probe may include a sensor that can only measure the magnitude (not direction) of stylus deflection; i.e. the scanning probe may comprise a multidirectional, single output scanning probe. For example, the scanning probe may comprise a TC76-Digilog or a TC64-Digilog scanning probe as manufactured by Blum Novotest GmbH, Germany or a model G25 probe sold by Marposs, Italy. The scanning probe may comprise sensors that can measure both the magnitude and direction of any stylus deflection. For example, the analogue measurement probe may generate three output signals that relate to the deflection of the stylus tip in three mutually orthogonal directions. The SPRINT (OSP-60) probing system manufactured by Renishaw plc, Wotton-Under-Edge, UK is an example of such a scanning probe.

It should be noted for completeness that scanning probes as described herein (which can sometimes also be called analogue probes) are different to so-called touch trigger probes. Touch trigger probes, which are sometimes termed digital probes, simply act as a switch. Deflection of the probe stylus from a rest position (e.g. when the stylus tip is moved into contact with the surface of an object) causes a trigger signal to be issued that is fed to the skip input of the machine tool. The machine tool measures the position of the touch trigger probe in the machine coordinate system (x,y,z) at the instant the trigger signal is issued, thereby allowing (with suitable calibration) the position of a single point on the surface of the object to be measured. A touch trigger probe is thus repeatedly driven into, and out of, contact with the surface of an object to take point-by-point position measurements of an object. Touch trigger probes are thus different to scanning probes in that they do not allow the collection of probe data whilst being scanned along a path on the surface of a workpiece. The method of the present invention is applicable only to scanning (not touch trigger) measurements.

According to a second aspect of the present invention there is provided a computer program comprising instructions which, when executed on a suitable computer, implement the method described above.

The invention also extends to a computer program product comprising instructions which when executed by a computer causes the computer to perform the above described method. The computer program product may comprise a data carrier, a storage medium, a computer readable medium (e.g. a non-transitory computer readable medium) or a signal (e.g. a transitory medium) etc.

The method conveniently also extends to programming and/or instructing the machine tool to drive a scanning probe along a scan path. For example, the method may include an initial step of programming the controller of a machine tool to implement a scan path for a scanning probe that produces probe data which has a characteristic from which a property of the scan path can be recognised. The step of programming the machine tool to implement a plurality of different scan paths may also be performed. The machine tool may also be programmed in accordance with any of the techniques that are described above in connection with the probe data analysis.

According to a second aspect of the present invention, there is provided an apparatus for analysing probe data collected by a scanning probe carried by a machine tool, the probe data being collected as the machine tool moves the scanning probe along a scan path relative to a workpiece, characterised in that the apparatus comprises a processor that identifies a property of the scan path used by the machine tool from a characteristic of the collected probe data. The apparatus may further comprise a scanning probe. The apparatus may further comprise an interface for a scanning probe. The apparatus may further comprise a machine tool. The machine tool may be programmed to drive the scanning probe along a scan path that produces probe data which has a characteristic from which a property of the scan path can be recognised. The apparatus may implement any aspect of the method described above.

According to a further aspect of the present invention, there is provide a method for analysing probe data collected by a scanning probe carried by a machine tool, the probe data being collected as the machine tool moves the scanning probe along a scan path relative to a workpiece, the method comprising the step of using the collected probe data alone to identify a property of the scan path used by the machine tool. The method may include any aspect of the apparatus and methods described above.

According to a further aspect of the present invention, there is provided machine tool setup method for determining one or more work offset corrections for a workpiece mounted within a machine tool. The method may comprise the step of a) using the machine tool to drive a scanning probe along a predefined scan path relative to a workpiece, the workpiece having been placed in a nominal position within the machine tool. A step b) may be performed of collecting probe data from the scanning probe that is indicative of the position of surface of the workpiece relative to the scanning probe whilst the scanning probe is being driven along the scan path. A step c) may comprise comparing the acquired probe data to the probe data that would be expected if the object was placed in a nominal location and orientation to generate one or more work offset corrections for feeding to the machine tool. Conveniently, step (c) comprises the step of identifying a property of the scan path used by the machine tool from a characteristic of the acquired probe data. The method may also include any aspect of the apparatus and methods described above.

Also described herein is a method for analysing probe data collected by a scanning probe carried by a machine tool. The probe data is preferably collected as the machine tool controls movement of the scanning probe relative to a workpiece. The scanning probe is preferably configured to collect probe data whilst it is being moved along a scan path relative to the workpiece. The method preferably comprises the step of identifying a property from a characteristic of the collected probe data. For example, a property of the measurement probe (e.g. stylus length, probe type etc.) may be identified from the collected probe data. Alternatively or additionally, a property of the machine tool may be identified from the collected probe data. Alternatively or additionally, a property of a scan path may be identified from the collected probe data. In a preferred embodiment, the method comprises programming the machine tool to introduce a characteristic or feature (e.g. a signalling segment, dwell period etc) into the probe data that can be recognised and used to identify the property. Any of the features, alone or in combination, also described elsewhere herein may be used in such a method.

BRIEF DESCRIPTION OF THE DRAWINGS

The invention will now be described, by way of example only, with reference to the accompanying drawings in which.

DESCRIPTION OF EXEMPLARY EMBODIMENT(S)

Figure 1:
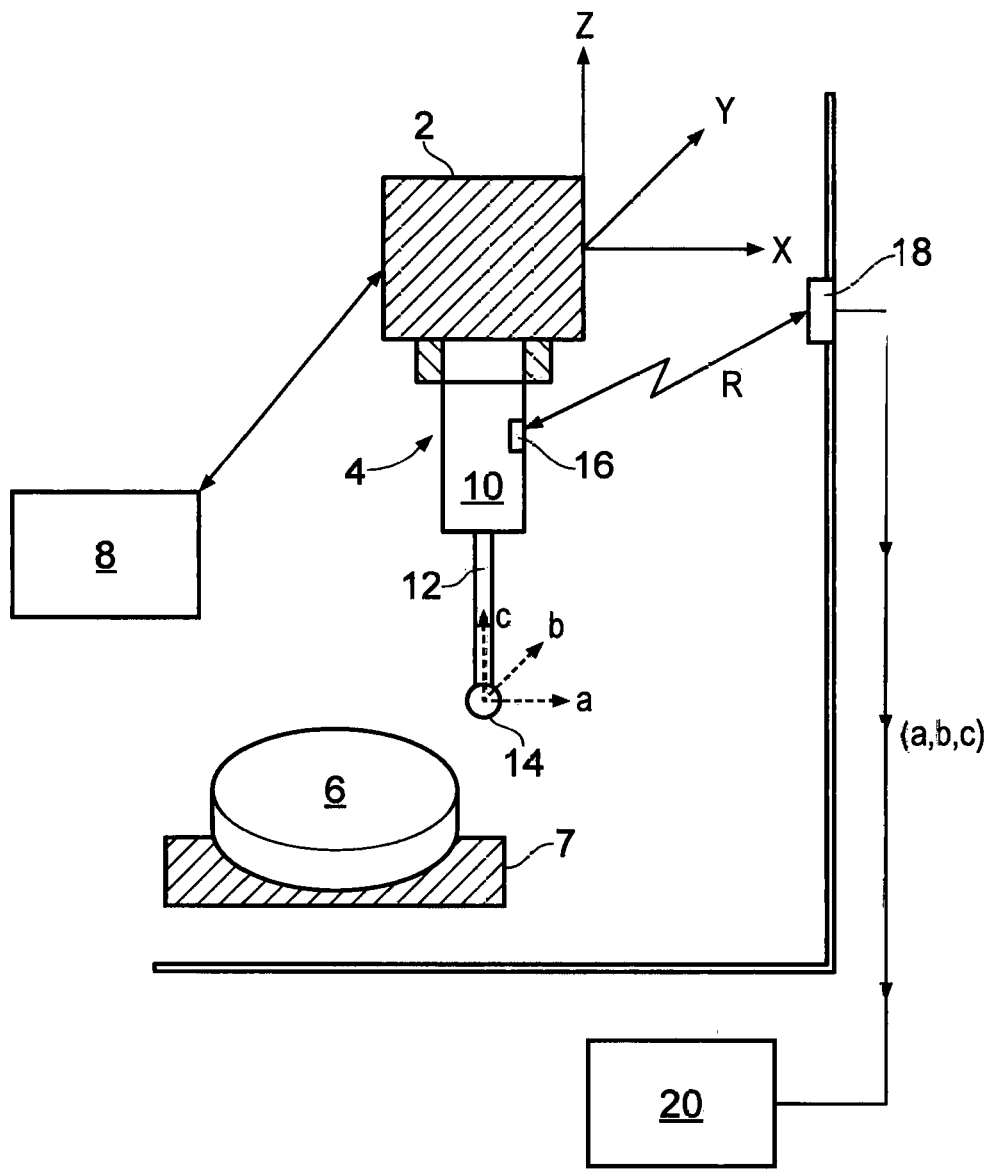
FIG. 1 illustrates a machine tool carrying a spindle mounted scanning probe.

Referring to FIG. 1, a machine tool is schematically illustrated having a spindle 2 holding a scanning probe 4.

The machine tool comprises motors (not shown) for moving the spindle 2 relative to a workpiece 6 located on a workpiece holder 7 within the work area of the machine tool. The location of the spindle within the work area of the machine is accurately measured in a known manner using encoders or the like; such measurements provide spindle position data (herein termed "machine data") that is defined in the machine co-ordinate system (x,y,z). A computer numerical controller (CNC) 8 of the machine tool controls movement of the spindle 2 within the work area of the machine tool and also receives the machine data describing spindle position (x,y,z).

The scanning probe 4 comprises a probe body or housing 10 that is attached to the spindle 2 of the machine tool using a standard releasable tool shank connection. The probe 4 also comprises a workpiece contacting stylus 12 that protrudes from the housing. A ruby stylus ball 14 is provided at the tip of the stylus 12 for contacting the associated workpiece 6. The stylus tip can deflect relative to the probe housing 10 and a transducer system within the probe body 10 measures deflection of the stylus in a local or probe coordinate system (a,b,c). The stylus deflection data acquired by the scanning probe is herein termed "probe data". The probe 4 also comprises a transmitter/receiver portion 16 that communicates with a corresponding receiver/transmitter portion of a remote probe interface 18. In this manner, probe data (i.e. a,b,c data values) from the scanning probe 4 are transmitted over a wireless communications link to the interface 18. A general purpose computer 20 is also provided to receive the probe data from the probe interface 18. The scanning probe 4 and interface 18 of the present example may comprise a SPRINT measurement probe system as manufactured by Renishaw plc, Wotton-Under-Edge, Glos., UK.

In use, the CNC 8 runs a part program that drives the scanning probe along a certain path; this path is often termed a tool path, although because a scanning probe rather than a cutting tool is being carried it is more properly termed a scan path. Probe data (i.e. a, b, c data values describing stylus deflection) and machine data (i.e. x, y, z values describing the position of the scanning probe in the machine coordinate system) are acquired as the scanning probe driven along the scan path.

For certain machine tools, the computer 20 can receive probe data and machine data for analysis. The probe data and machine data may be combined, after suitable calibration etc., to provide a series of measurements that define the position of points on the surface of the workpiece. As described in U.S. Pat. No. 7,970,488 such data sets may conveniently be aligned using a common timing signal. Such arrangements are suitable when high accuracy measurements of high value, complex parts (e.g. turbine blades etc.) are required because the time taken to transfer and process the large amounts of data is acceptable. There are, however, various applications where fast measurement cycle times are key. For example, workpiece location and/or workpiece inspection in high throughput machining applications. Examples of such workpiece location and workpiece inspection technique will now be described in more detail.

Figure 2:
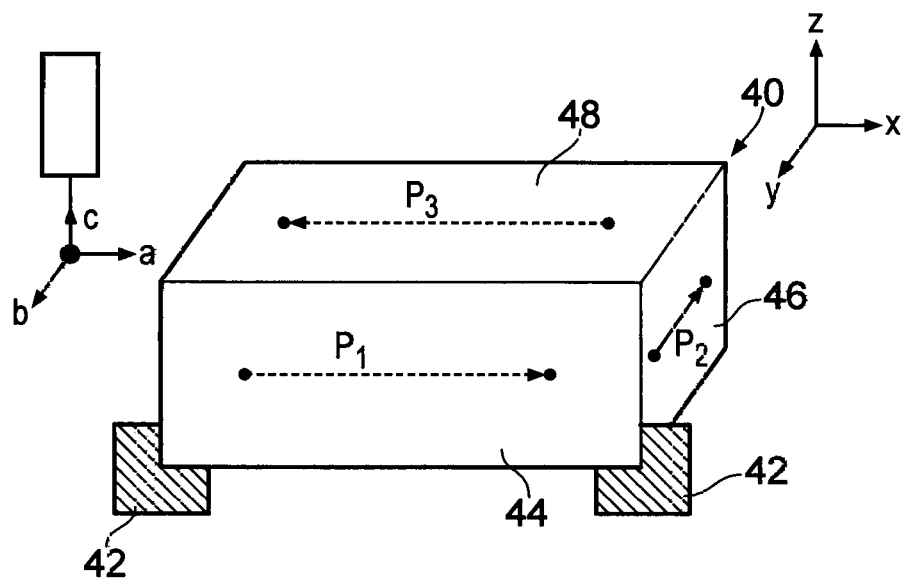
FIG. 2 illustrates workpiece location technique.

Referring to FIG. 2, a simple example of a workpiece location measurement process using the machine tool apparatus described with reference to FIG. 1 will now be described. A workpiece location procedure is often used prior to machining to accurately locate the workpiece in the machine volume. The workpiece described in this example is one of a series of nominally identical workpieces that are sequentially fitted onto a fixture. Variations in workpiece geometry in combination with fixture repeatability cause the actual workpiece location in the machine coordinate system to vary slightly. The workpiece thus needs to be located prior to machining, so that the machining is performed with the cutting tool in the correct location relative to the workpiece.

The workpiece 40 illustrated in FIG. 2 comprises a substantially rectangular metal block that is placed in a fixture 42 on the bed of a machine tool. The use of the fixture 42 means that the position of the block is known with millimetre accuracy, but the subsequent machining (e.g. cutting) operations to be performed on the workpiece 40 require its position and angular alignment to be found with greater accuracy.

The workpiece location and angular alignment is found by CNC 8 of the machine tool causing the scanning probe 4 to be moved along first, second and third scan paths. The first scan path causes the stylus tip of the scanning probe to be moved along a first path (P1) on the long edge 44 of the object. The second scan path causes the stylus tip of the scanning probe to be moved along a second path (P2) on the short edge 46 of the object. The third scan path causes the stylus tip of the scanning probe to be moved along a third path (P3) on the top surface 48 of the object. The scanning probe may be moved at a high speed (e.g. using a rapid move) along each of the scan paths. It is therefore possible for each of the first, second and third scan paths to be traversed in as little as one to three seconds.

The scanning probe 4 is enabled so as to collect probe data whilst the stylus is being moved along the first, second and third scan paths. In particular, the CNC 8 may be programmed to send the scanning probe 4 (via the probe interface 18) an "enable on" signal at the start of each scan path and an "enable off" signal at the end of each scan path. First, second and third sets of probe data may thus be generated that relate to measured stylus deflection as the scanning probe is moved along the first, second and third scan paths. These first, second and third sets of probe data may be separately passed from the scanning probe 4 to the computer 20 via the probe interface 18 immediately after the "enable off" instruction for the relevant scan path is received. The generation and transmission of such probe data is performed without any need to interact or receive data from the machine tool and hence the transfer of probe data to the computer 20 can be performed very quickly. This should be contrasted to receiving machine data or other information from the machine tool, which may be slow (e.g. due to slow data links) or simply not possible during certain periods of time when a program is being executed by the CNC 8.

An aim of the workpiece location procedure is to collect and analyse the measurement information relating to workpiece location in as short a time as possible. The result of the measurement procedure (e.g. data relating to any required orientation or angular corrections) are then fed to the CNC 8 to allow the cutting procedures to be adapted accordingly. Any delay waiting for the computer 20 to receive information from the machine tool may only be a few seconds or fractions of a second, but this can still be significant when short cycle times are key.

As explained above, it has been proposed previously in U.S. Pat. No. 7,765,708 to perform analysis on probe data alone thereby avoiding the need to transfer machine data from the machine tool to an external computer. This, however, still requires the processing system to have some knowledge of the probe data that is being received to allow that probe data to be processed accordingly. Merely waiting for information from the NC about the scan path can introduce delays that can be significant for workpiece location applications. Furthermore, it may not be possible to access such information from certain (e.g. older or lower specification) machine tools.

It should also be noted that the Productivity+ CNC plug-in system produced by Renishaw plc has the ability to pre-program a CNC machine tool and an external probing and processing system with a matched pair of programs. The CNC contains the program to make the measurement and the external programming system contains the program to analyse the measurement. In this case the user must ensure that the matched pair of programs remains matched throughout any design changes which may take place. This can present a logistical challenge and can result in mismatched measurement and analysis programs, which is undesirable.

It is also known to perform location measurements using a "master" source program that is run by the CNC. This master program is the program used to control the movement of the CNC but it also communicates data and instructions on how to analyse that data to an external processing system (which, unlike the CNC, has the computational power to perform complex analysis of large amounts of data) that performs the necessary analysis. This system works well but can present a significant overhead in terms of the cycle time on the machine tool which is used for the transfer of data, particularly where technologies such as RS-232, file polling, or software connections with a slow update rate are used.

The method of the present invention avoids the need to receive any information at all from the CNC 8 during the measurement procedure (although some data could still be supplied, if required). Instead, the computer 20 uses a characteristic of the collected probe data to identify a property of the scan path. In the example illustrated in FIG. 2, the (a,b,c) axes of the scanning probe are nominally aligned with the (x,y,z) axes of the machine tool. The scan paths P1, P2 and P3 can thus be distinguished from one another by the direction in which the stylus is deflected. In particular, the probe data will show stylus deflection predominantly along the b-axis, a-axis and c-axis for the scan paths P1, P2 and P3 respectively. In this simple example, the characteristic of the probe data from which a property of the scan path can be identified is hence the main direction of stylus deflection. The computer 20 can thus be programmed with a decision-making algorithm that can use the probe data alone to determine the feature under measurement. For ease of processing, the computer 20 may assume that any probe data it receives relates to one of the scan paths P1, P2 and P3.

The present invention can thus be implemented using a single master program run by the CNC of the machine tool, but does not require any communication to an external processing unit (i.e. computer 20 in the present example) to define the analysis intent. The overhead of cycle time for communication is thus reduced. In this manner, the use of a scanning probe can substantially decrease the cycle time used for measuring the workpiece, which is desirable as it increases the availability of the machine for cutting and therefore allows a greater number of workpieces to be produced in a given period of time. An additional benefit is that deployment of the system becomes easier as fewer configurations need to be made to establish communication.

Figure 3:
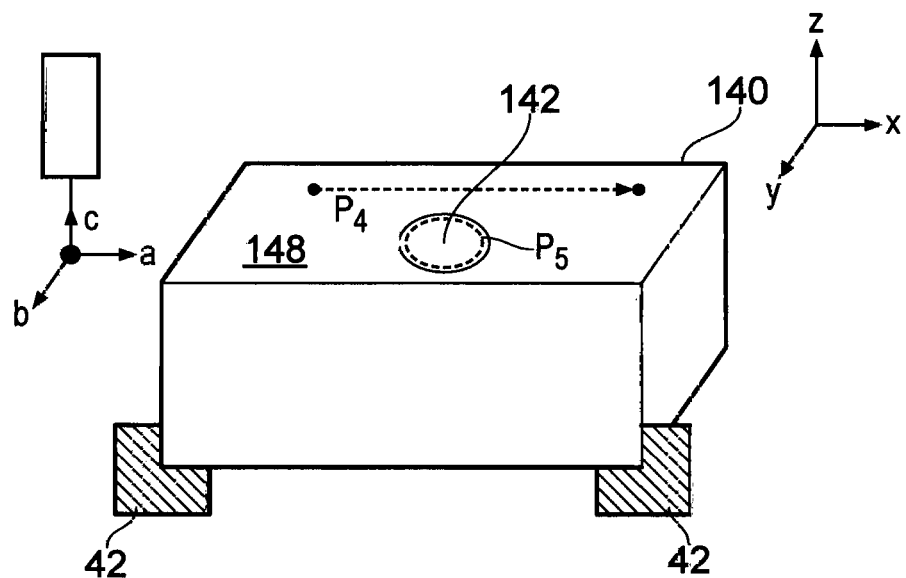
FIG. 3 illustrates a workpiece inspection technique.

Referring to FIG. 3, a workpiece inspection process of the present invention will be described. Workpiece inspection is commonly used to verify the state of the finished workpiece, prior to removal of the workpiece from the machine tool. Although workpiece inspection, or "on-machine verification" (OMV) takes additional cycle time on the machine tool (i.e. to measure the workpiece) it can represent an overall net saving in cycle time across all processes when workpieces that would otherwise become scrap are identified and rectified on the machine.

FIG. 3 illustrates a workpiece 140 comprising a substantially rectangular metal block that is placed in a fixture 42 on the bed of a machine tool. The location of the workpiece 140 may have been determined using the technique described above with reference to FIG. 2 prior to certain machining (i.e. metal cutting) operations being performed by the machine tool. The machining operations performed include boring a circular hole 142 in the workpiece 140 and removing material from the upper surface 148 of the workpiece 140.

A post-machining inspection measurement may be performed to verify the correct amount of material has been removed from the upper surface 148 and that the circular hole 142 has the correct diameter and circularity. The machine tool may thus move the scanning probe along fourth and fifth scan paths to verify the machining operations. The fourth scan path causes the stylus tip of the scanning probe to be moved in a straight line along a fourth path (P4) on the upper surface 148 of the workpiece 140. The fifth scan path causes the stylus tip of the scanning probe to be moved in a circular motion along a fifth path (P5) that traces a path around the inside surface of the circular hole 142. The fourth and fifth sets of probe data may thus be generated that relate to measured stylus deflection as the scanning probe is moved along the fourth and fifth scan paths.

The fourth and fifth sets of probe data are passed to the computer 20. The computer 20 analyses the probe data to ascertain if the data is derived from a line scan (e.g. if the probe data has a characteristic that the stylus deflection varies in magnitude in approximately the same direction during the scan) or a bore scan (e.g. if the probe data has a characteristic that the stylus deflection rotates during the scan). This allows a property of the scan path (i.e. whether it relates to a line scan or bore scan) to be identified.

After the characteristic of the probe data has been used to identify the scan path property (e.g. a line scan or bore scan in this example) the probe data may be processed accordingly. In the case of the line scan, the scanning probe is commanded to move along a path on the surface of the workpiece with the stylus deflected by a known and predefined amount relative to the nominal workpiece surface. The material condition (e.g. the positional offset of the actual surface, compared to the nominal surface) may thus be calculated along the line on the surface. An angular characteristic may also be calculated. It should be noted that since the feed rate along the surface is unknown the angular characteristic may be represented as, for example, degrees per elapsed second in time. Form error may also be calculated by fitting the probe data to a function. The result of this analysis can be logged (e.g. stored on a system external to the machine tool) for quality control purposes or may be sent back to the CNC to be applied as an offset and used in subsequent machining actions.

The above example of workpiece location and inspection techniques are simply to aid understanding of the invention. For the type of components which require very high-speed inspection or workpiece location, it has been found that distinguishing between the following three feature types would typically be sufficient: i) lines (providing material condition, angular offset, and form), ii) circular features (providing a material condition, positional offset, and form) and iii) planes (providing material condition, angular offset, and form). In addition, there may be probe data generated for other reasons which are to be distinguished from the probe data generated for the features mentioned above. For example, the following could be recognised: (iv) a probe calibration toolpath (where a known feature is measured and used to linearize the outputs of the probe, prior to subsequent measurement) and (v) raw data for free-form surface measurement.

To aid identification, the CNC 8 may be provided with a predefined set of programs which can drive toolpaths (i.e. scan paths) to measure certain features. These programs may be fixed, meaning that they do not change for each workpiece. For example, the feature being measured may be deduced from pre-defined set of features that the machine tool is pre-programmed to measure.

Figures 4A, 4B, 4C:
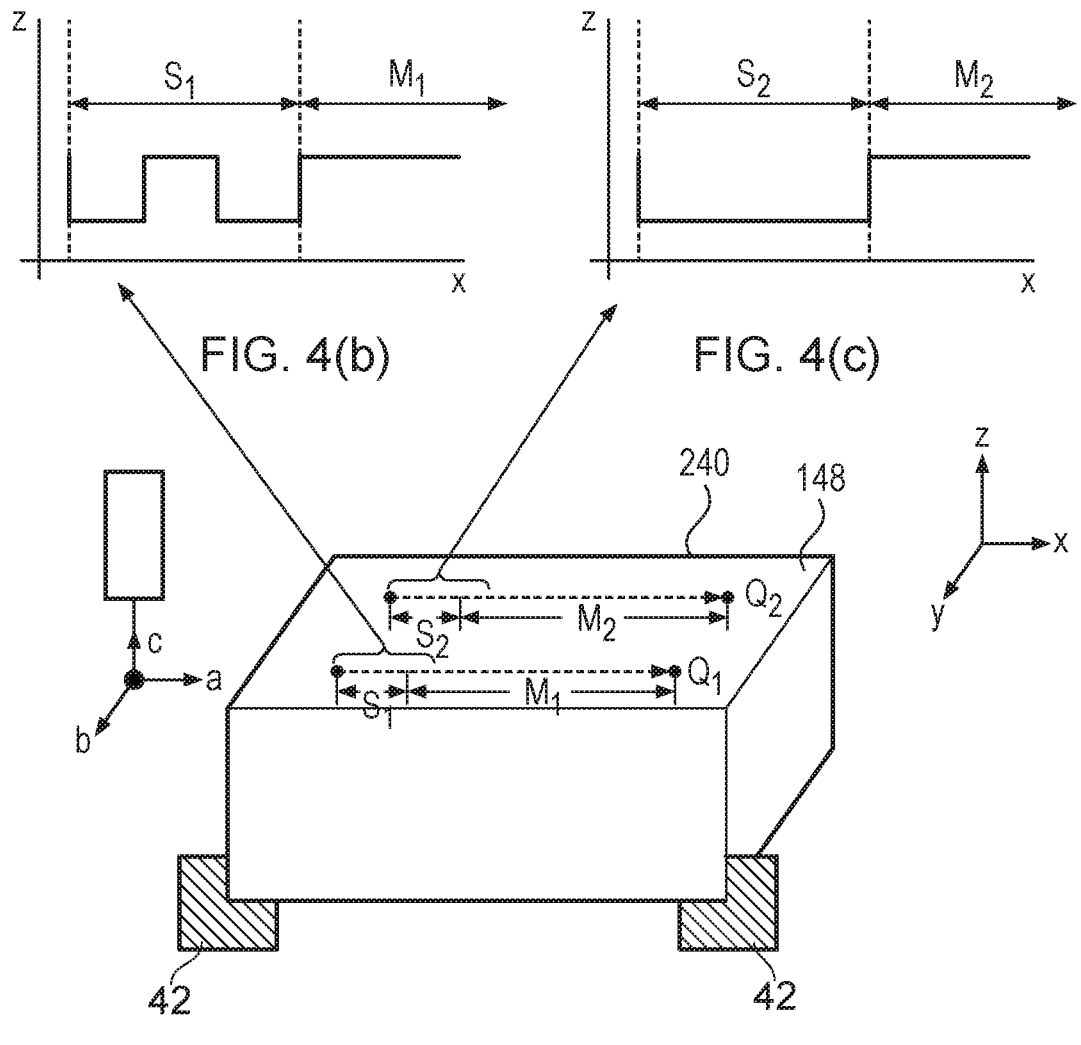
FIGS. 4a-4c show the introduction of a signalling segment into the scan path to facilitate scan path identification.

Referring to FIGS. 4a-4c, it will be described how a characteristic feature may be introduced into the probe data by adaptation of the scan path. In particular, it has been found that in some cases it can be difficult to distinguish between certain feature types by analysis of the probe data alone. For example, it may be desirable to distinguish between a nominal circle and a nominal ellipse because a distorted ellipse may be misinterpreted as a circle, or vice versa. There may also be a need to distinguish between line scans on two regions of a workpiece. In these cases, some or all of the CNC machine toolpaths used for measurement may be modified so as to provide an additional "signalling pattern". This signalling pattern is provided over and above the stylus deflection caused by measurement of the relevant feature alone.

FIG. 4a shows a workpiece 240 having an upper surface 148 that is affixed to the bed of a machine. The workpiece may be measured using a scanning probe carried by the spindle of the machine tool as described above. Two linear paths are scanned on the upper surface 148. A first linear scan path causes the stylus tip of the scanning probe to be moved in a straight line along a first path Q1 and a second linear scan path causes the stylus tip of the scanning probe to be moved in a straight line along a second path Q2.

The first path Q1 comprises an initial signalling segment S1 followed by a measurement segment M1. The second path Q2 comprises an initial signalling segment S2 followed by a measurement segment M2.

FIG. 4b shows the commanded z-height of the scanning probe as it is driven along the first linear scan path. As can be seen, a constant z-height is maintained during the measurement segment M1 but two steps in z-height (i.e. inducing scanning probe motion towards and away from the surface) are provided in the initial signalling segment S1. A first set of probe data is collected from the scanning probe as it is driven along the first linear scan path.

FIG. 4c shows the commanded z-height of the scanning probe as it is driven along the second linear scan path. As can be seen, a constant z-height is maintained during the measurement segment M2 but a lower z-height (i.e. moving the scanning probe further into the surface) is provided in the initial signalling segment S1. A second set of probe data is collected from the scanning probe as it is driven along the second linear scan path.

Although the measurement segments M1 and M2 produce probe data having no inherent characteristics that allow them to be distinguished from each other, the signalling segments S1 and S2 produce probe data having different (distinguishable) characteristics. In particular, stylus deflection along the c-axis of the scanning probe includes either a double or single step depending on whether the scanning probe is being driven along signalling segment S1 or S2. Analysis of the c-axis deflection characteristic of the probe data associated with the initial signalling segment of the scan thus allows a property of the scan path (i.e. whether the first path Q1 or the second path Q2 is being traversed) to be identified.

It should be noted that the probe data from the signalling segment may include useful measurement data (i.e. data that is used to provide some kind of measurement of the workpiece) or it may include data that is only used to identify the scan path. Although an initial signalling segment is shown, the signalling section may be provided at the end of the scan path or within a middle part of the scan path.

Figure 5:
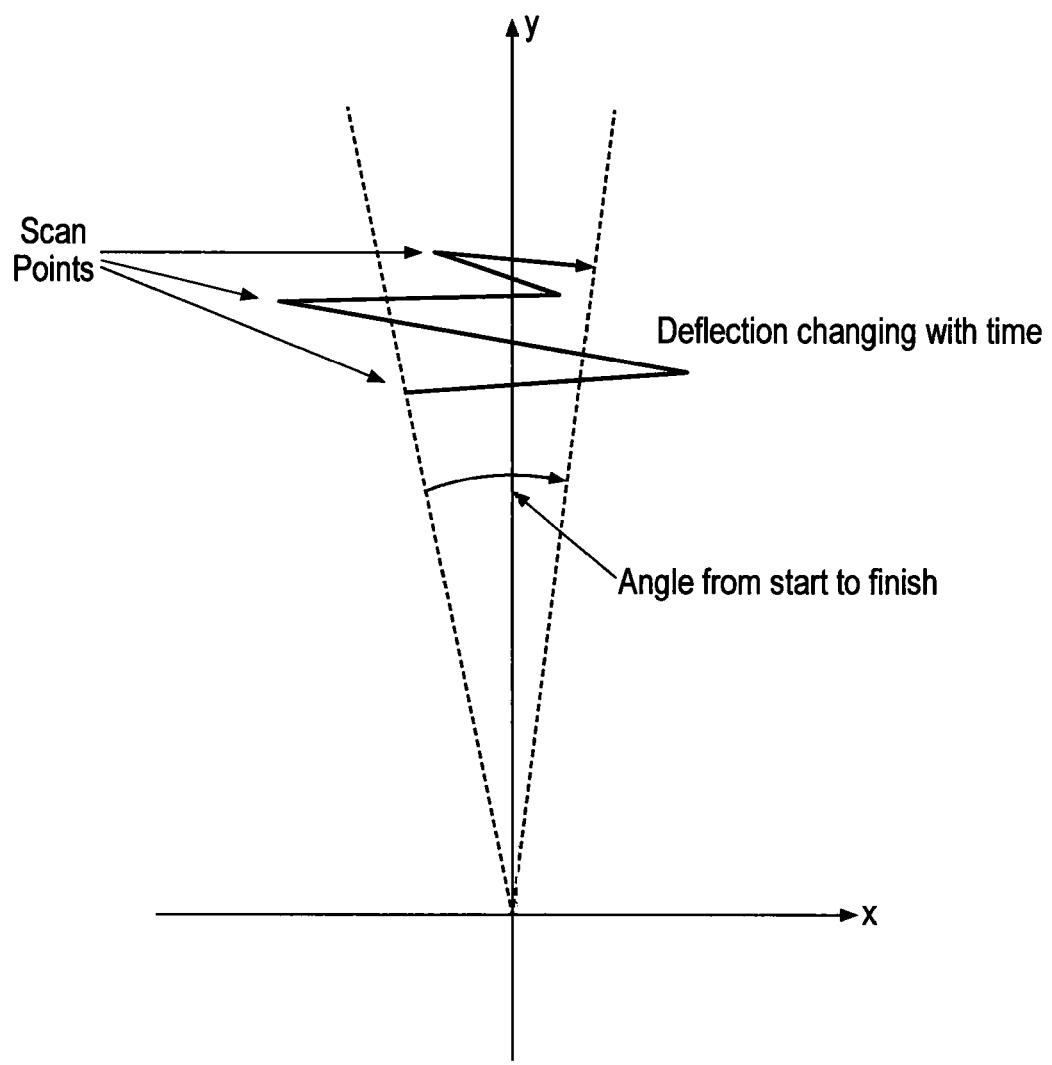
FIG. 5 shows a line scan representation.
Figure 6:
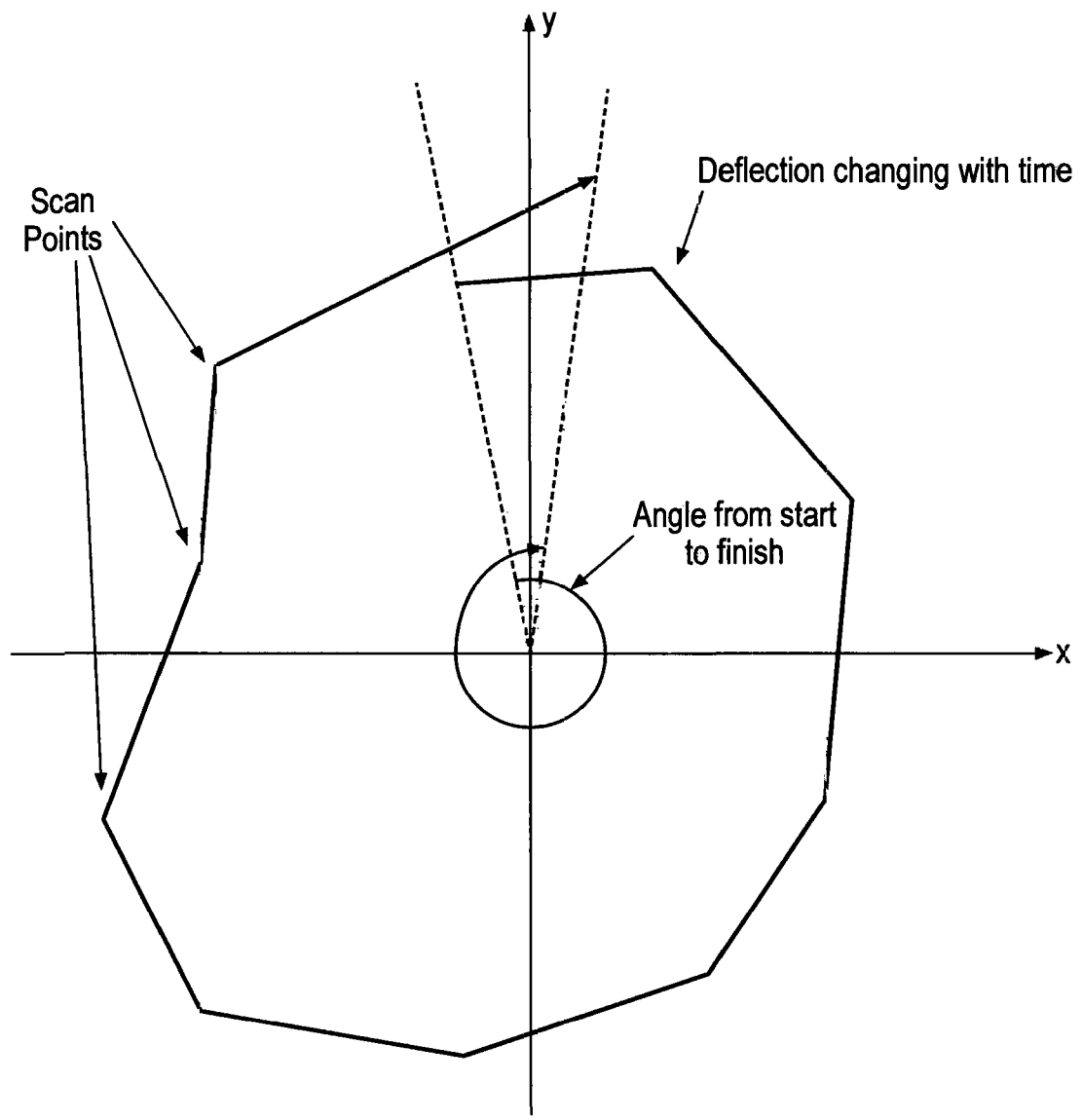
FIG. 6 shows a circle scan representation.

An algorithm will now be described with reference to FIGS. 5 and 6 that analyses probe data sets to identify whether that data was collected during a line scan or circular scan. The algorithm is arranged to identify the type of a scan (i.e. line or circle) based only on the (stylus deflection) data collected by the scanning probe. The input to the algorithm is a GML PointSet containing all the probe data collected between the ENABLE ON and ENABLE OFF instructions in a single section of measurement code run the CNC. The status bits will indicate the error flags generated by the black box.

The algorithm involves the following steps:

The first step comprises trimming the input probe data set to remove any bad (e.g. undeflected points collected before the stylus contacts the surface) from the beginning or end. The beginning (and end) of the actual scan is taken to be indicated by the first (or last) series of SCAN_START_CONSECUTIVE_POINTS (=20) consecutive deflected non-bad points.

The second step comprises applying a basic filter to the trimmed probe data set. This is a moving average filter which takes no reference to any surface nominal direction (which is not yet known).

The third step comprises identifying any overriding direction of the filtered data points. This is done by identifying the largest continuous subsequence of the filtered data in which all the deflections are in the same Cartesian direction. Any bad data points are skipped when identifying this overriding direction. If the overriding direction is positive Z we have a line swipe on the top of a surface.

If the scanning probe was not found to have been deflected in positive Z in the third step, a fourth step is performed that comprises identifying if the points in the deflected part form a circle about the z-axis (this is described in more detail below). If they do it can be concluded there was a circle swipe, otherwise it was a line swipe. In the case of a circle, the direction in which the line goes about the z-axis allows detection of whether it was an inside or outside circle. Specifically, an anticlockwise circle represents an outside circle while a clockwise circle represents an inside circle.

If the fourth step identifies a line, then a fifth step assumes the nominal deflection has been identified as the overriding direction found in the third step. If it was an inside or outside circle, the starting position is identified based on the largest Cartesian component of the first deflected, valid point in the scan.

It will now be described how the probe data is analyzed to assess whether it results from a scan path around a circle or along a line as per the fourth step mentioned above. In particular, having identified the scan as not being z-deflected (i.e. in the third step), the following condition is used to identify if the scan is a circle or line. All the scan points are projected onto the X-Y plane. A straight line is then drawn from every deflected, non-bad point in the filtered data to the next deflected, non-bad point. The angle subtended about the origin by the resulting line is then found. The subtended angle is determined efficiently by finding the angle between the first and last points in the scan (with the angle being positive if the last point is anticlockwise about the origin from the first point) and (a) adding $2\pi$ for every straight segment of the total line which crosses the negative x-axis from positive y to negative y and (b) subtracting $2\pi$ for every such segment which crosses from negative y to positive y. If this angle is greater than 180 degrees or less than minus 180 degrees, the resulting line is an outside or inside circle swipe, respectively. A circle classification is shown in FIG. 6. Otherwise (e.g. if the deflections do not form a circle about the z-axis) it is identified as a line swipe as shown in FIG. 5.

It should be remembered that the above embodiments are examples of the present invention. The skilled person would be aware of many variations and alternatives that would be possible in accordance with the invention.

The invention claimed is:

1. A method for analysing probe data collected by a scanning probe carried by a machine tool, the probe data being collected as the machine tool moves the scanning probe along a scan path relative to a workpiece, the method comprising:
   a step of identifying a property of the scan path traversed by the scanning probe, from a characteristic of the collected probe data alone, without using any information from the machine tool including any positional data indicating relative positions of the scanning probe moving along the scan path as controlled by the machine tool.

2. The method according to claim 1, wherein the step of identifying a property of the scan path traversed by the scanning probe comprises identifying a type of scan path from a plurality of different types of scan path.

3. The method according to claim 1, wherein the step of identifying a property of the scan path traversed by the scanning probe comprises identifying a scan path from a plurality of different scan paths.

4. The method according to claim 1, where the characteristic of the collected probe data comprises an inherent characteristic of the probe data that is associated with a measurement of a feature of the workpiece.

5. The method according to claim 4, wherein the scanning probe comprises a contact scanning probe having a deflectable stylus and the inherent characteristic comprises a variation in a direction of stylus deflection and/or a magnitude of stylus deflection.

6. The method according to claim 1, wherein the characteristic of the collected probe data comprises a variation in probe data provided by one or more variations introduced into the scan path to allow the scan path to be identified.

7. The method according to claim 6, wherein the scan path traversed by the scanning probe comprises at least one signaling segment that produces probe data having an identifiable characteristic.

8. The method according to claim 1, wherein the collected probe data comprises a discrete set of data points collected between the machine tool issuing instructions to the scanning probe to start collecting probe data and to stop collecting probe data.

9. The method according to claim 8, wherein the characteristic of the collected probe data comprises a number of data points within the discrete set of data points.

10. The method according to claim 1, wherein probe data is collected as the machine tool moves the scanning probe along a plurality of scan paths relative to the workpiece, wherein a property of each of the plurality of scan paths is identified from a characteristic of the probe data collected from each scan path without using any information from the machine tool including any positional data indicating relative positions of the scanning probe moving each scan path as controlled by the machine tool.

11. The method according to claim 1, comprising a further step of analysing the probe data to extract measurement information, wherein a type of analysis performed on the probe data is determined from the identified property of the scan path.

12. The method according to claim 1, wherein the step of identifying a property of the scan path traversed by the scanning probe is performed on a processor that is external to the machine tool.

13. The method according to claim 1, wherein the scanning probe comprises a contact scanning probe having a deflectable stylus and at least one transducer for measuring an amount of deflection of the stylus.

14. A non-transitory computer readable medium storing a program comprising instructions which, when executed on a suitable computer, implement the method according to claim 1.

15. The method according to claim 1, wherein:
when the scanning probe traverses a circular scan path, the identified property of the scan path indicates whether the circular scan path is a circular scan of a boss or a bore of the workpiece, and
when the scanning probe traverses a linear scan path, the identified property of the scan path indicates a length of the linear scan path.

16. An apparatus for analysing probe data collected by a scanning probe carried by a machine tool, the probe data being collected as the machine tool moves the scanning probe along a scan path relative to a workpiece, the apparatus comprising:
a processor that identifies a property of the scan path traversed by the scanning probe, from a characteristic of the collected probe data alone, without using any information from the machine tool including any positional data indicating relative positions of the scanning probe moving along the scan path as controlled by the machine tool.

17. A method for analysing probe data collected by a scanning probe carried by a machine tool, the probe data being collected as the machine tool moves the scanning probe along a scan path relative to a workpiece, the method comprising:
a step of using the collected probe data alone to identify a property of the scan path traversed by the scanning probe, without using any information from the machine tool including any positional data indicating relative positions of the scanning probe moving along the scan path as controlled by the machine tool.

18. A machine tool setup method for determining one or more work offset corrections for a workpiece mounted within a machine tool, the method comprising steps of:
a) using the machine tool to drive a scanning probe along a predefined scan path relative to a workpiece, the workpiece having been placed in a nominal position within the machine tool;
b) collecting probe data from the scanning probe that is indicative of a position of surface of the workpiece relative to the scanning probe whilst the scanning probe is being driven along the scan path; and
c) comparing the acquired probe data to probe data that would be expected if an object was placed in a nominal location and orientation to generate one or more work offset corrections for feeding to the machine tool,
wherein step (c) comprises a step of identifying a property of the scan path traversed by the scanning probe, from a characteristic of the acquired probe data alone without using any information from the machine tool including any positional data indicating relative positions of the scanning probe moving along the scan path as controlled by the machine tool.

* * * * *